H. M. SCHEIBE.
VARIABLE SPEED MOTOR.
APPLICATION FILED JUNE 5, 1913.
1,189,296.
Patented July 4, 1916.
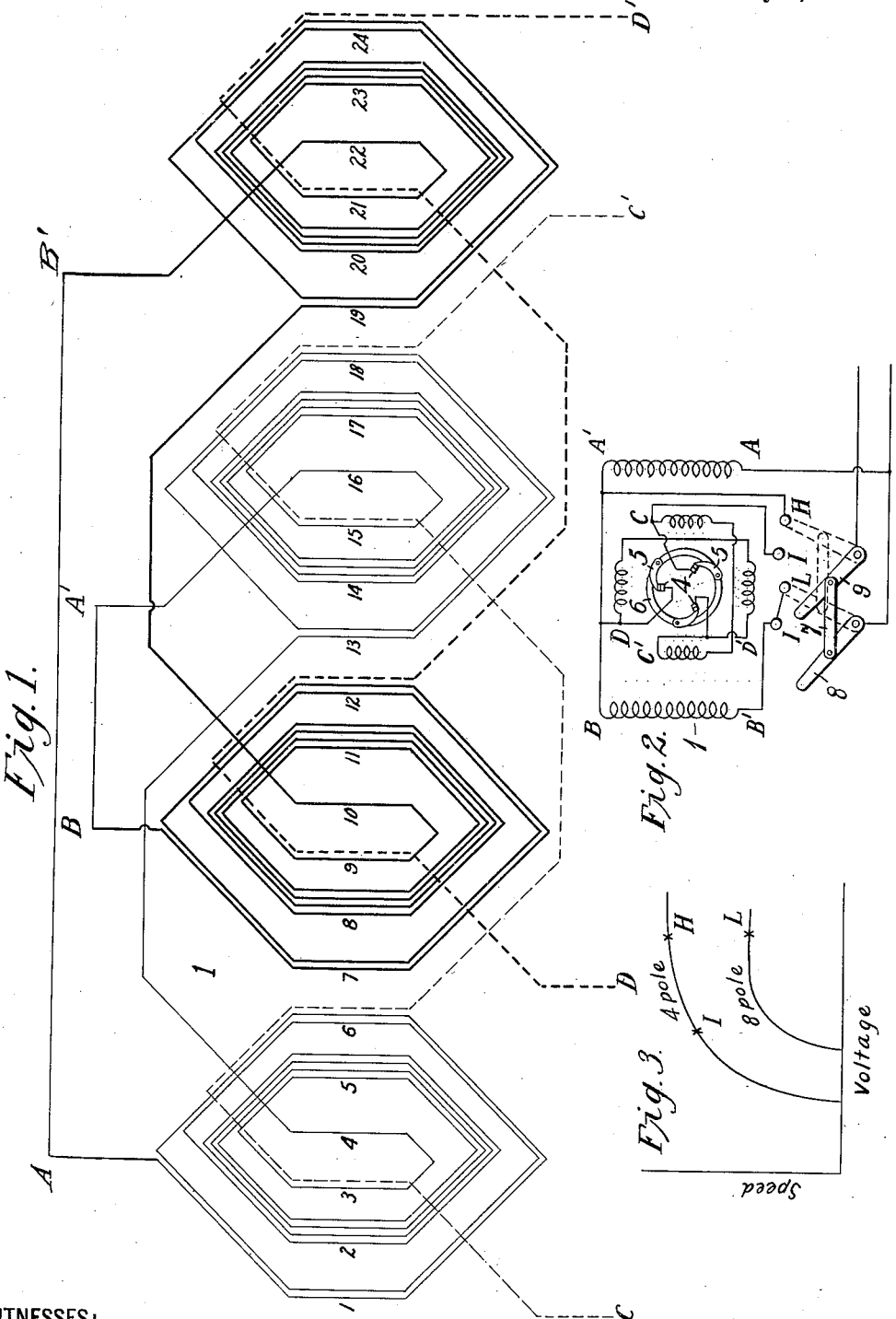

UNITED STATES PATENT OFFICE.

HAROLD M. SCHEIBE, OF WILKINSBURG, PENNSYLVANIA, ASSIGNOR TO WESTINGHOUSE ELECTRIC AND MANUFACTURING COMPANY, A CORPORATION OF PENNSYLVANIA.

VARIABLE-SPEED MOTOR.

1,189,296.   Specification of Letters Patent.   Patented July 4, 1916.

Application filed June 5, 1913. Serial No. 771,878.

*To all whom it may concern:*

Be it known that I, HAROLD M. SCHEIBE, a citizen of the United States, and a resident of Wilkinsburg, in the county of Allegheny and State of Pennsylvania, have invented a new and useful Improvement in Variable-Speed Motors, of which the following is a specification.

My invention relates to variable-speed motors and particularly to single-phase induction motors such as are used for operating fans or other devices.

One object of my invention is to provide a simple and effective means whereby the speed of a motor of the character indicated above may be varied within wide limits and without loss of power.

A further object of my invention is to provide a structure whereby the motor may be started at various points on a speed-controlling switch, and the starting loss occasioned by the use of auxiliary starting means will be eliminated when the motor reaches a predetermined speed.

Various methods have been employed to change the speed of induction motors. For example, a variation in amount of inductance or resistance in the primary circuit or a variation in the resistance of the secondary circuit will have a corresponding effect upon the speed of the motor. Each of these methods, however, affects the efficiency of the motor and does not produce a sufficient variation in the speed. The variation of the speed of an induction motor must be within comparatively narrow limits because of its inherent qualities, as shown by its characteristic curve. It is not possible to increase its speed beyond a certain amount and, when the speed drops below a critical value, the motor will stop because of insufficient torque. The present practice commonly requires motors of different designs for high and low speeds, respectively.

According to my present invention, I provide a motor with main windings the connections of which may be changed to vary the number of poles produced thereby. An auxiliary winding operates as a shading coil in starting the motor and also serves to vary the speed when connected in series with the main windings. The motor is arranged to operate at three speeds, according to the position of the control switch. The motor will start when the switch is set on any point and the starting loss produced by the auxiliary winding, acting as a shading coil, will be eliminated before the motor attains the corresponding speed.

The details of my invention will be described in connection with the accompanying drawings in which—

Figure 1 is a diagrammatic view of a motor winding arranged in accordance with my invention. Fig. 2 is a diagrammatic view of the motor circuits and controlling means therefor. Fig. 3 is a diagram showing certain curves relating to the operation of the motor.

The motor, the mechanical structure of which is not shown, may be of the squirrel cage type and be provided with a stator 1 having, for example, 24 slots as shown in Fig. 1. The stator windings comprise two main windings A A$^1$ and B B$^1$ and two auxiliary windings C C$^1$ and D D$^1$. The main windings are arranged to be connected to produce diametrically opposite poles in two pairs. The auxiliary windings are also connected to produce pairs of alternate poles.

Referring particularly to Fig. 2, the terminals A$^1$ and B of the main windings are permanently connected. The terminals C$^1$ and D$^1$ of the auxiliary windings are also permanently connected, their point of connection and the terminals C and D being respectively connected to suitable contact pieces 4. The contact pieces 4 are adapted to be connected by centrifugally actuated contact members 5 and a ring 6 to which the contact members 5 are connected. A switch 7, comprising movable contact members 8 and 9, controls the connections of the various windings and thereby the speed of the motor. When the switch 7 is moved from the full line or "off" position to the first or low-speed position, in which the contact member 9 engages the terminal contact member L of the winding B B$^1$, the main windings are connected in series and four like poles are produced by the four groups of coils illustrated in Fig. 1. The result is to produce four consequent poles between the poles directly produced by the windings, and the motor is, in effect, an eight pole machine. The auxiliary windings are short circuited by the centrifugal members 5 and the ring 6. As will be noted, the auxiliary windings will tend to produce poles that are displaced from the main poles and thus act as shading coils to enable the motor to start. When the motor attains a predetermined speed, the centrifugal members 5 which are mounted on the motor shaft, move outwardly to open the short circuit of the auxiliary coils. When the control switch is moved to the high-speed position, indicated in dotted lines in Fig. 2, the contact members 8 and 9 engaging the contact members L and H, respectively, the main windings are connected in two parallel circuits, the current being reversed through the winding B B$^1$. The polarity of the poles produced by the winding B B$^1$ is now opposed to that of the poles produced by the winding A A$^1$ and the result is a four pole motor. As is well known, the effect of changing the magnetic field of a motor from eight to four poles is to double its synchronous speed. When the switch is moved to an intermediate position, in which the contact members 8 and 9 engage the terminal contact members II, the main windings are connected as in the high-speed position. When the centrifugal members 5 fly outwardly at the predetermined speed, the auxiliary windings are connected in series with the parallel group of main windings. The effect of thus increasing the number of turns in the primary winding of the motor, the applied voltage remaining the same, is to reduce the speed of the motor. By properly choosing the proportions and relations of the several windings, an intermediate speed is produced which is substantially midway between the high and the low speeds.

It will be noted that the motor may be started at each of the speeds with the auxiliary windings acting as a shading coil and that the starting loss occasioned thereby is automatically cut out when a predetermined speed is reached. The motor may be operated as a high-speed or as a low-speed machine, as desired, without incurring losses by the use of external speed-varying devices. An intermediate speed is also provided without the use of a choke coil such as is commonly used for varying the speeds of fan motors.

In Fig. 3 are shown two curves which represent the relation of the speeds and voltages of the four pole and eight pole arrangements, respectively. It will be noted that the eight pole arrangement enables the motor to operate at a low speed L, which value is within the stable portion of its curve but which would fall upon the unstable portion of the other curve. The intermediate speed point I and the higher speed point II fall within the stable limits of the curve of the four pole arrangement.

While I have shown and described the details of a motor constructed in accordance with my invention, it is understood that such details are illustrative only and not intended as limitations other than as defined in the appended claims.

I claim as my invention:

1. In a motor, the combination with a main winding and an auxiliary winding, of means for automatically short circuiting said auxiliary winding at low speeds, and speed controlling means comprising means for varying the connections of said main windings and said auxiliary windings.

2. In a motor, the combination with a main winding and an auxiliary winding, of means for short circuiting said auxiliary winding in starting the motor and for connecting said auxiliary winding in series with said main winding at a predetermined speed.

3. In a motor, the combination with a main winding and an auxiliary winding displaced from the main winding, of means for short circuiting said auxiliary winding below a predetermined speed, and means for connecting said main and auxiliary windings in series.

4. In an induction motor, the combination of main windings and auxiliary windings, of means for connecting said main windings to produce a plurality of magnetic poles and for otherwise connecting said main windings to increase the number of poles, and a centrifugally actuated device for short-circuiting said auxiliary windings below a predetermined speed and for connecting said auxiliary windings in series with said main windings at said predetermined speed.

5. The combination with an alternating-current motor provided with a main field circuit including a plurality of main field windings and with an additional main field circuit including a plurality of main field windings which are respectively staggered with respect to said first mentioned field windings, of an auxiliary field circuit including a plurality of field windings staggered with respect to said main field windings, means for connecting said main field circuits in series to an alternating-current source, and means for short circuiting said auxiliary field circuit at starting.

6. The combination with an alternating-current motor provided with a main field circuit including a plurality of main field windings and with an additional main field circuit including a plurality of main field windings which are respectively staggered with respect to said first mentioned field windings, of an auxiliary field circuit including a plurality of field windings staggered with respect to said main field windings, means for connecting said main field circuits in series to an alternating-current source, and means for short circuiting said auxiliary field circuit at starting and for subsequently automatically opening said short circuit.

7. The combination with an alternating-current motor provided with a main field circuit including a plurality of main field windings, and with an additional main field circuit including a plurality of main field windings which are respectively staggered with respect to said first mentioned field windings, of an auxiliary field circuit including a plurality of field windings staggered with respect to said main field windings, means for connecting said main field windings to a source of alternating current in parallel with each other and both in series with said auxiliary winding, and means for short circuiting said auxiliary winding at starting and for subsequently automatically removing said short circuit.

8. The combination with an alternating-current motor provided with a main field circuit including a plurality of main field windings and with an additional main field circuit including a plurality of main field windings which are respectively staggered with respect to said first mentioned field windings, of an auxiliary field circuit including a plurality of field windings staggered with respect to said main field windings, means for connecting said main field windings to a source of alternating current in parallel with each other, and means for short circuiting said auxiliary winding at starting and for subsequently automatically removing said short circuit.

9. The combination with an alternating-current motor provided with a main field circuit including a plurality of main field windings, and with an additional main field circuit including a plurality of main field windings which are respectively staggered with respect to said first mentioned field windings, of an auxiliary field circuit including a plurality of field windings staggered with respect to said main field windings, means for first connecting said main field circuits to a source of alternating current in series with each other and for subsequently connecting said field circuits to said source in parallel to each other and in series with said auxiliary field circuit, and means for short circuiting said auxiliary winding at low speeds and for automatically removing said short circuit at higher speeds.

10. The combination with an alternating-current motor provided with a main field circuit including a plurality of main field windings, and with an additional main field circuit including a plurality of main field windings which are respectively staggered with respect to said first mentioned field windings, of an auxiliary field circuit including a plurality of field windings staggered with respect to said main field windings, means for first connecting said main field circuits to a source of alternating current in parallel to each other and in series with said auxiliary field circuit and for then connecting said main field circuits directly to said source in parallel with each other, and means for short circuiting said auxiliary field winding at low speeds and for automatically removing said short circuit at higher speeds.

11. The combination with an alternating-current motor provided with a main field circuit including a plurality of main field windings, and with an additional main field circuit including a plurality of main field windings which are respectively staggered with respect to said first mentioned field windings, of an auxiliary field circuit including a plurality of field windings staggered with respect to said main field windings, means for first connecting said main field circuits to a source of alternating current in series with each other, for then connecting said main field circuits to said source in parallel with each other and in series with said auxiliary winding, and for then connecting said main field circuits directly to said source in parallel with each other, and means for short circuiting said auxiliary winding at low speeds and for automatically removing said short circuit at higher speeds.

12. The combination with an alternating-current motor provided with a main field circuit including a plurality of main field windings, and with an additional main field circuit including a plurality of main field windings which are respectively staggered with respect to said first mentioned field windings, of means for so energizing said field circuits that adjacent field windings are of opposite polarity or for so energizing said field circuits that pairs of adjacent field windings are of like polarity and alternate pairs are of opposite polarity, and an auxiliary field circuit on said motor including a plurality of field windings staggered with respect to the resultant poles produced by said main field circuits under either of the above mentioned conditions.

13. The combination with an alternating-current motor provided with a main field circuit including a plurality of main field windings, and with an additional main field circuit including a plurality of main field windings which are respectively staggered with respect to said first mentioned field windings, of means for so energizing said field circuits that adjacent field windings are of opposite polarity or for so energizing said field circuits that pairs of adjacent field windings are of like polarity and alternate pairs are of opposite polarity, an auxiliary field circuit on said motor including a plurality of field windings staggered with respect to the resultant poles produced by said main field circuits under either of the above-mentioned conditions, and means for short circuiting said auxiliary field winding.

14. The combination with an alternating-current motor provided with a main field circuit including a plurality of main field windings, and with an additional main field circuit including a plurality of main field windings which are respectively staggered with respect to said first mentioned field windings, of means for so energizing said field circuits that adjacent field windings are of opposite polarity or for so energizing said field circuits that pairs of adjacent field windings are of like polarity and alternate pairs are of opposite polarity, an auxiliary field circuit on said motor including a plurality of field windings staggered with respect to the resultant poles produced by said main field circuits under either of the above-mentioned conditions, and means for short circuiting said auxiliary field winding at low speeds and for automatically removing said short circuit at higher speeds.

In testimony whereof, I have hereunto subscribed my name this 15th day of May, 1913.

HAROLD M. SCHEIBE.

Witnesses:
B. B. HINES,
M. C. MERZ.